United States Patent
Shine, Jr. et al.

[11] Patent Number: 5,479,430
[45] Date of Patent: Dec. 26, 1995

[54] PROTECTIVE COATING FOR SOLID STATE SLAB LASERS

[75] Inventors: Robert J. Shine, Jr., Mountain View; Anthony J. Alfrey, Woodside; Robert L. Byer, Stanford, all of Calif.

[73] Assignee: The Board of Trustees of the Leland Stanford Junior University, Stanford, Calif.

[21] Appl. No.: 384,948

[22] Filed: Feb. 7, 1995

[51] Int. Cl.$^6$ .................................................. H01S 3/06
[52] U.S. Cl. ............................. 372/66; 372/72; 372/34; 372/35; 372/36
[58] Field of Search ........................ 372/66, 71, 72, 372/34–36

[56] References Cited

U.S. PATENT DOCUMENTS

| | | | |
|---|---|---|---|
| 4,984,246 | 1/1991 | Cabaret et al. | 372/35 |
| 5,084,888 | 1/1992 | Tajima et al. | 372/72 |
| 5,084,889 | 1/1992 | Tajima | 372/66 |
| 5,299,220 | 3/1994 | Brown et al. | 372/71 |
| 5,373,576 | 12/1994 | Minns et al. | 372/6 |

*Primary Examiner*—Leon Scott, Jr.
*Attorney, Agent, or Firm*—Marek Alboszta

[57] ABSTRACT

A protective coating [26] and a method for applying the same on an optically pumped solid state laser [10] having a lasing medium in the form of a slab [12] with at least two opposed parallel pumping faces [18, 20] between which a laser beam [11] propagates along a zig-zag path dictated by total internal reflection between these pumping faces. The slab [12] has an input face [14] for coupling in the laser beam and an output face [16] for coupling it out. The protective coating [26] is an organic synthetic, processed thermoplastic, or thermosetting polymer. Preferred materials include polymethylmethacrylate (PMMA), polyvinylidene chloride (PVC), polyethylene, polyimide, and Mylar.

The protective coating [26] is applied onto the slab [12] from a solution in which the solvent is selected from the group of materials consisting of ketones, esters, and perfluorinated solvents. Most preferably, the protective coating [26] is a random copolymer of tetrafluoroethylene (TFE) and 2,2,bis-trifluoromethyl-4,5 difluoro 1,3 dioxole, traded under the name Teflon AF (R), and the solvent is a perfluorinated solvent. Most preferably, the perfluorinated solvent is a completely fluorinated organic compound comprising primarily $C_8F_{18}$ (e.g., Fluorinert FC-75 (R)).

17 Claims, 2 Drawing Sheets

PROTECTIVE COATING FOR SOLID STATE SLAB LASERS

This invention was made with Government support under contract no. DAAL03-90-C-0026, awarded by the Army. The Government has certain rights in the invention.

BACKGROUND—FIELD OF THE INVENTION

The present invention relates to the field of optically pumped solid state lasers, and in particular to a protective coating for solid state slab lasers.

BACKGROUND—DESCRIPTION OF PRIOR ART

High-power optically pumped laser devices have earned well-deserved recognition in the field of optics. One group of such lasers includes those that have a solid state active medium in the form of a slab with at least two carefully polished parallel faces used to confine the laser beam by total internal reflection as it travels through the length of the slab. Pump sources for such lasers include arc lamps or semiconductor laser diodes.

The pumping beam can be introduced into the slab from any direction. It is imperative, however, that the energy of the pumping beam distributed in a homogeneous manner, or that non-homogeneous distribution of energy in the slab be eliminated. Uniformity is important here because a large portion of the pumped energy is converted into thermal energy inside the slab. The thermal gradient inside the solid state active medium can create stress birefringence and thermal lensing effects. Laser beam quality is thus degraded in the high-power operating range. Therefore, the objective in a slab laser design is to achieve a uniform thermal gradient. The laser beam can be induced to travel along such path as to average out the heat distribution throughout the slab. Such averaging can be achieved by forcing the laser beam, when inside the slab, to propagate in a zig-zag optical path.

The thermal problem is addressed by Martin in U.S. Pat. No. 3,663,126 issued Jan. 17, 1972. The unpumped faces of the slab are insulated while the parallel faces which reflect the laser beam, thus forcing it to propagate along a zig-zag trajectory, are cooled. This produces a one-dimensional thermal profile inside the slab and improves beam quality. However, the solution poses a new problem, namely how to efficiently cool the pumped faces without adversely affecting the laser beam.

An early design of zig-zag slab lasers used flowing water or other fluid as coolant for the pumped surfaces. In moving along the pumped surface the coolant would absorb heat generated in the slab. However, technical difficulties were encountered in trying to preserve laminar coolant flow. The resulting turbulence caused phase distortions in the output beam. These distortions are due to the fact that an evanescent wave exists along the slab boundary where total internal reflection occurs. The total internal reflection is influenced by the refractive index of the materials located along the interface, in this case the turbulent water along the slab surface. The external material—coolant—and its inhomogeneities affect the evanescent wave altering both the phase and amplitude of the internally reflected laser beam.

In a different arrangement O-ring seals were placed around the slab. To be effective, the seals had to be positioned away from locations at which the internal zig-zag laser beam impinged on the pumping surface, i.e., at the nodes between the points of internal reflection. Otherwise, the O-rings would absorb a fraction of the laser energy contained in evanescent waves extending beyond the surface and be destroyed.

In his U.S. Pat. No. 3,679,999 issued Jul. 25, 1972 Chernoh discloses a conduction-cooled slab laser. In particular, he uses a thin gas layer as a heat conductor in thermal contact with the slab. A high thermal conductivity solid, itself cooled by a cooling agent, e.g., water, is in thermal contact with the gas. Unfortunately, this solution is hampered by the inherently low thermal conductivity of gases which produce a large thermal resistance across the gas layer. In addition, the gas layer must be of uniform thickness which is extremely difficult to produce and maintain.

Another solution taught by von Arb et al. in U.S. Pat. No. 4,881,233 issued Nov. 14, 1989 calls for applying a dielectric coating on the slab. The index of refraction and thickness of this coating is chosen to preserve the total internal reflection of the zig-zag laser beam. Thus, water can flow against the coating without disrupting the laser beam. However, the application of this dielectric coating requires a complicated coating chamber. The large layer thickness and uniformity required for this application is difficult to achieve. This results in a considerable strain within the coating layer. Frequently, the strain is severe enough to cause delamination and cracking. A poor quality coating can not be remedied by removal and re-application, thus rendering the expensive slab useless.

In sum, none of the above-mentioned methods of protecting the slab against thermal gradients and preserving the zig-zag laser beam is effective. These solutions are very cumbersome, expensive, and can not be easily merged with other improvements to the slab, e.g., application of anti-reflective coatings.

OBJECTS AND ADVANTAGES OF THE INVENTION

In view of the above it is an object of the invention to provide a protective coating for a solid state slab laser which does not disturb the total internal reflection of the laser beam and simultaneously permits the use of an efficient coolant. Any turbulent flow characteristics of such coolant do not affect the reflections.

It is another object of the invention to render this protective coating easy to apply and remove, thus making high-quality slab lasers more economical to produce and use.

Still another object of the invention is to ensure that such a protective coating does not prevent the application of other useful coatings on the slab.

These and other objects and advantages will become more apparent after consideration of the ensuing description and the accompanying drawings.

SUMMARY OF THE INVENTION

The protective coating for optically pumped solid state slab lasers overcomes the disadvantages of prior art by virtue of its unique constitution and application method. In particular, the protective coating is used in an optically pumped solid state laser having a lasing medium in the form of a slab with at least two opposed parallel pumping faces between which a laser beam propagates along a zig-zag path dictated by total internal reflection between these pumping faces. The slab has an input face for coupling in the laser beam and an output face for coupling it out. The protective coating of the invention is applied on at least the two pumping faces or, in some cases, the entire slab, with the exception of the input and output faces.

The protective coating is selected from a group of materials comprising organic synthetics, processed thermoplastics, and thermosetting polymers. Among these materials are included polymethylmethacrylate (PMMA), polyvinylidene chloride (PVC), polyethylene, polyimide, and Mylar. Furthermore, the protective coating is applied to the slab from a solution in which the solvent is selected from the group of materials consisting of ketones, esters, and perfluorinated solvents.

Preferably, the protective coating is a random copolymer of tetrafluoroethylene (TFE) and 2,2,bis-trifluoromethyl-4,5 difluoro 1,3 dioxole, traded under the name Teflon AF (R) (manufactured by 3M company of Minnesota), and the solvent is a perfluorinated solvent. Most preferably, the perfluorinated solvent is a completely fluorinated organic compound comprising primarily $C_8F_{18}$ (e.g., Fluorinert FC-75 (R) distributed by 3M company). The thickness of the protective coating is preferably adjusted according to the wavelength of the laser beam to ensure that an evanescent wave does not cause energy leakage from the slab to any external coolant.

Finally, the invention also discloses a method for applying the protective coating. The advantage of applying the protective coating from solution is that it can be applied in a very precise and uniform manner. A protective coating thus deposited avoids the disadvantages of prior art coatings. Dipping or otherwise immersing the coated slab in the solvent also allows the removal of the protective coating if defects are later discovered.

A thorough understanding of the invention can be gained from the detailed description below and attached drawing figures.

DESCRIPTION

Figure 1:
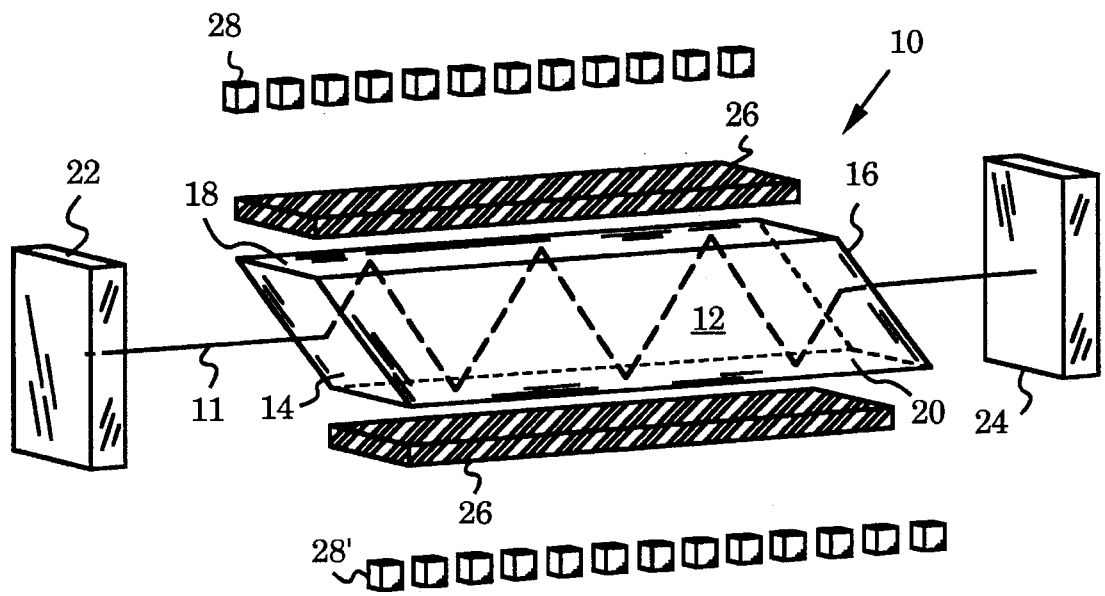
FIG. 1 is an exploded perspective view of a solid state slab laser with a protective coating according to the invention.

The simplest and preferred embodiment of the invention is shown in FIG. 1. An optically pumped solid state laser 10 has a lasing medium or slab 12 designed to amplify and guide a laser beam 11 along a zig-zag path. The shape of slab 12 is that of a parallelepiped with an input face 14 and an output face 16. Slab 12 is made of any solid state laser material, e.g., Nd:YAG or Nd:Glass. Further, the refractive index $n_1$ of slab 12 is higher than that of the surrounding materials so that laser beam 11 is confined within slab 12 by total internal reflection. Both faces 14, 16 are slanted at an apex angle s from the horizontal (see FIG. 2). Slab 12 also has a top pumping face 18 and a bottom pumping face 20. Faces 18 and 20 are two parallel and opposite faces of the parallelepiped.

A high reflector 22 and an output coupler 24 are provided at the ends of laser 10. In this embodiment high reflector 22 is a curved mirror with a 20 cm radius of curvature. Output coupler 24 is flat. Of course, there are numerous other arrangements of high reflector 22 and output coupler 24 yielding a viable cavity for laser 10.

A protective coating 26 covers top pumping face 18 and bottom pumping face 20. Coating 26 consists of a plastic or a polymer chosen from among organic synthetics, processed thermoplastics, or thermosetting polymers. Preferably, coating 26 is a random copolymer of tetrafluoroethylene (TFE) and 2,2,bis-trifluoromethyl-4,5 difluoro 1,3 dioxole (hereafter abbreviated as 2,2-bis-T), a prefluoropolymer sold by DuPont under the name Teflon AF(R) 1600 and Teflon AF(R) 2400. In particular, Teflon AF(R) 1600 is composed of 50 mol % TFE and 50 mol % 2,2-bis-T while Teflon AF(R) 2400 includes 15 mol % TFE and 85 mol % 2,2-bis-T. The present embodiment uses Teflon AF(R) 1600.

The chosen polymer is optically clear throughout the visible and near infra-red regions of the spectrum. This ensures that it will transmit the pumping light described below. It is soluble in perfluorinated solvents, such as Fluorinert FC-75 (R) sold by 3M company of Minnesota, and its refractive index is approximately 1.3. The thickness $t_m$ (see FIG. 3) of coating 26 can range from less than 3 µm to more than 15 µm. The actual thickness desired for coating 26 depends on the laser wavelength and total internal reflection angle as described below. Coating 26 has a refractive index $n_c$ which is smaller than the refractive index $n_1$ of slab 12.

Two sets of laser diodes 28 and 28' are positioned above and below slab 12 respectively. These pump laser 10 through pumping faces 18 and 20 respectively. This embodiment employs a total of 25 laser diodes 28 and 28' (type SDL-3450P5). However, as is well-known, any other suitable light sources, including arc lamps, can be used for pumping laser 10.

Figure 2:
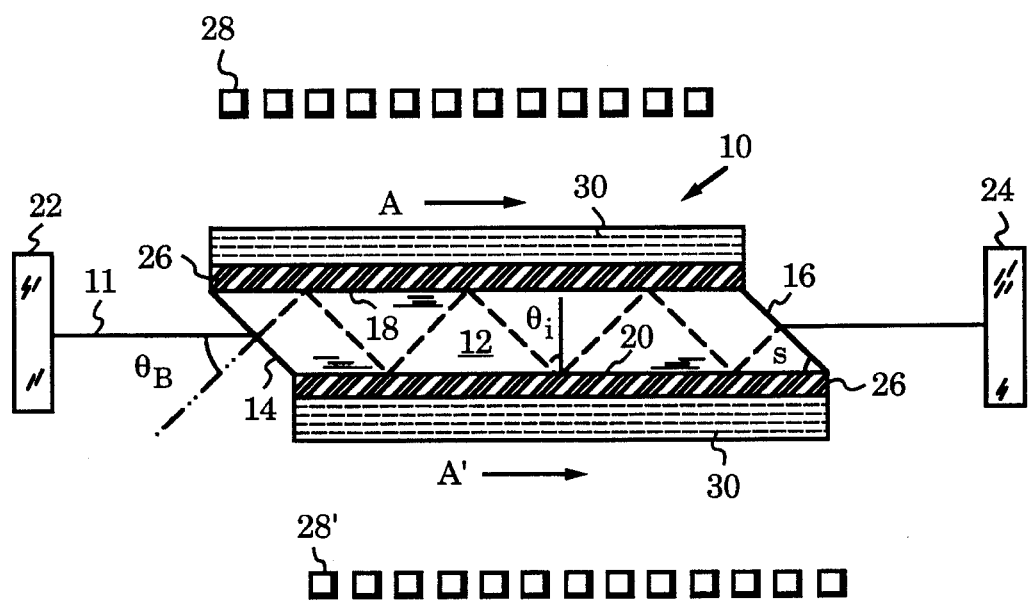
FIG. 2 is a side view of the slab laser in FIG. 1.

FIG. 2 shows laser 10 of FIG. 1 in a side view. A coolant 30 flows along the surface of slab 12, for example as shown by arrows A and A'. In the preferred embodiment coolant 30 is a liquid which has a high heat capacity and is transparent to the pumping light, e.g., water. Of course, other liquids can be used as well. One can also use a solid material as coolant 30. In this case the material has to be optically transparent to pumping light emitted by diodes 28 and 28' and establish good thermal contact with pumping faces 18 and 20.

Figure 3:
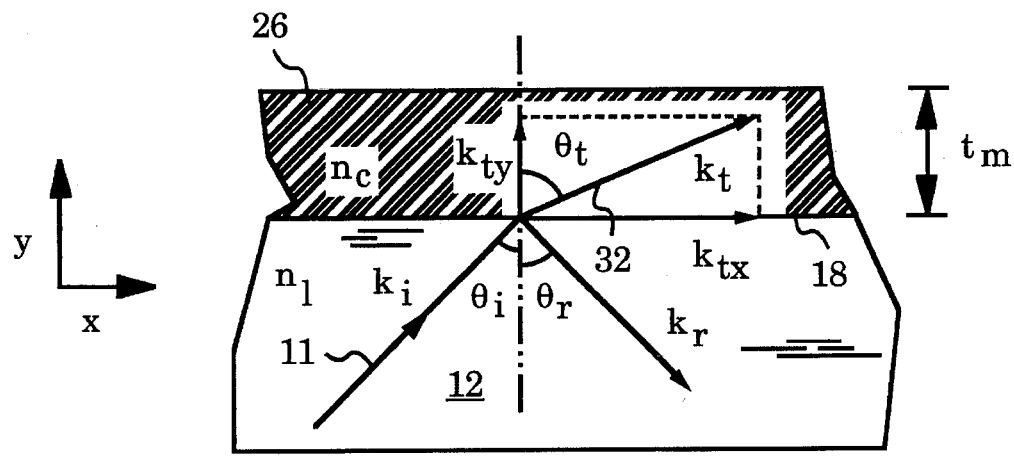
FIG. 3 is a detailed diagram of the events taking place at the interface between the protective coating and the slab laser.
Figure 4:
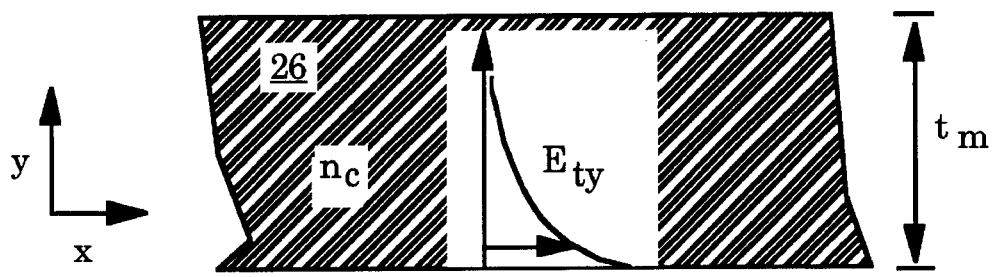
FIG. 4 is a detailed diagram illustrating the propagation of an evanescent wave inside the protective coating.

The operation of laser 10 is best explained in reference to FIGS. 2, 3, and 4. Laser beam 11 enters slab 12 from the right side through input face 14. Beam 11 is incident on input face 14 at a Brewster angle $\theta_B$ which is determined from known optics principles and the equation:

$$\tan(s) = 1/n_1$$

where s is the apex angle. For Nd:YAG slabs $n_1=1.82$ and for Nd:Glass slabs $n_1=1.5$. In-coupling of beam 11 into slab 12 at the Brewster angle $\theta_B$ ensures low reflective losses. Of course, other in-coupling angles are also permissible, as are any other well-known beam in-coupling methods.

Once inside the high-index laser material 12 beam 11 propagates along a zig-zag path undergoing total internal reflection at pumping faces 18 and 20. Beam 11 exits through output face 16 at the other end of slab 12 after undergoing any number of internal reflections or bounces. The actual number of bounces, which may vary considerably for different slabs, is determined by the length of slab 12 and a critical angle $\theta_c$ at which beam 11 must impinge on faces 18 and 20 to sustain total internal reflection.

FIG. 3 shows in detail the phenomena taking place at face 18 and protective coating 26. Beam 11, having a wave number $k_i$, is incident on face 18 at an angle of incidence $\theta_i$. To sustain total internal reflection the angle of incidence $\theta_i$ must be larger than the critical angle $\theta_c$. Beam 11 thus experiences internal reflection at an angle of reflection $\theta_r$. After reflection the wave number $k_r$ of beam 11 remains equal to $k_i$. This internal reflection condition is described by the formula:

$$n_c < n_1 \sin(\theta_i)$$

in which $n_c$ is the refractive index of slab 12 and $n_1$ is the refractive index of protective coating 26. The values of $n_c$ are selected to preserve total internal reflection. For example, for Brewster angle incidence Nd:YAG slabs $n_c$ is less than 1.53 and for Brewster angle incidence Nd:Glass slabs $n_c$ is less than 1.38. The value of $n_c$ can be easily adjusted by selecting the proper material for coating 26 as described below.

Nevertheless, a small portion of the electrical field E constituting beam 11 manages to traverse face 18 into protective coating 26 in the form of an evanescent wave 32 whose wave number is $k_t$. The electric field $E_t$ of evanescent wave 32 is described by:

$$E_t = E_{0t} e^{-\beta y} \exp[i([k_{tx} \sin \theta_t / n_{c1}] - \omega t)]$$

where $n_{c1} = n_c/n_1$. The horizontal component $k_{tx}$ of transmitted wave 32 thus propagates along the interface between slab 12 and coating 26 in the form of a surface or evanescent wave. The vertical component $k_{ty}$ of evanescent wave 32 decays exponentially according to the $e^{-\beta y}$ factor and becomes negligible at a distance of several wavelengths from face 18. In particular:

$$k_{ty} = -ik_t([\sin^2 \theta_t / (n_{c1})^2] - 1)^{1/2} = \pm i\beta$$

the wave number k being defined as $k = 2\pi n/\lambda$ where $\lambda$ represents the wavelength. Thus, unless the refractive index $n_c$ of coating 26 is very close to the cutoff value the vertical component $k_{ty}$ of evanescent wave 32 will essentially disappear after penetrating a distance of a few wavelengths. This is best illustrated by FIG. 4 which shows the exponential decay of the y-component or electric field $E_{ty}$ of evanescent wave 32 from FIG. 3. The graph is superimposed on coating 26 to show how the amplitude of electric field $E_{ty}$ decreases as one moves further into coating 26. The y-axis represents distance and the x-axis the amplitude of electric field $E_{ty}$.

In the preferred embodiment the thickness $t_m$ of coating 26 is between 3 μm and 15 μm. Preferably, thickness $t_m$ should be on the order of several wavelengths $\lambda$ of the light of laser beam 11. The exponential decay of the electric field $E_{ty}$ dictates that already at a distance of more than $3\lambda$ into coating 26 evanescent wave 32 is virtually negligible. A coating 26 with a thickness of $t_m$ equal to more than $3\lambda$ is thus recommended. In fact, in the most preferred embodiment the thickness $t_m$ of coating 26 corresponds to about $5\lambda$. This means that evanescent wave 32 decays inside coating 26 by 5 e-foldings (a factor of $e^{-5}$) and virtually no energy leaks through coating 26 to coolant 30. Consequently, the energy carried by laser beam 11 does not penetrate through coating 26 to dissipate outside slab 12. In effect, coating 26 ensures that the total internal reflection of the laser beam is not disrupted and permits the use of coolant 30, since turbulence in coolant 30 then has no influence on beam 11. The typical energy loss experienced by beam 11 per bounce ranges from 0.1% to 0.2%.

These advantageous properties are further ensured by the constitution of coating 26 and its application method. Coating 26 is chosen from the group of materials consisting of plastics and polymerized substances such as polymethylmethacrylate (PMMA), polyvinylidene chloride (PVC), polyethylene, polyimide and Mylar.

The plastic or polymerized substance must first be dissolved. Advantageous solvents for producing the solution include many organic solvents such as ketones or esters. The most preferred embodiment employs Teflon AF (R) dissolved in a perfluorinated solvent, mostly preferably Fluorinert FC-75 (R), a solvent consisting of a completely fluorinated organic compound, primarily $C_8F_{18}$, manufactured by 3M company.

The solution of Teflon AF (R) in Fluorinert (R) is preferably a 1% to 5% by wt. solution. The Teflon AF film is first dissolved and then filtered to remove impurities such as dust. Upon application, e.g., with an eyedropper, solvent evaporates within 5 minutes. Of course, the solution can be applied to faces 18 and 20 by any well-known coating method. For example, the solution is painted onto the faces of slab 12. Coating 26 remains when the solvent evaporates.

Another advantageous application method involves spinning the solution onto the slab faces, as is done with photoresist in micro-lithography. This process allows the careful monitoring of the final thickness $t_m$ of coating 26 and guarantees that it equals approximately $5\lambda$. Also, coatings produced in this manner are highly uniform, thus ensuring high surface quality and excellent coverage of slab 12.

Still other methods include dipping slab 12 in solution. In this case the thickness $t_m$ is controlled by adjusting the speed at which slab 12 is withdrawn from the solution or by performing repeated dipping steps. There are many well-known techniques for applying a coating from solution onto a slab of material and any of those can be advantageously employed for producing coating 26.

The application of coating 26 from solution renders the process easy to perform and very accurate. The resulting coating 26 exhibits a high degree of uniformity and an even surface. Coating 26 also conforms closely to the surface of slab 12. As a result, this type of protective coating is not prone to fractures or delamination. Furthermore, the coating material can be easily removed from slab 12 by applying the solvent to the dried coating. This allows the re-application of coating 26 on poorly coated slabs which are in danger of delamination and would otherwise be discarded. Thus application of the coating from solution is very cost-effective and easily adaptable to large-scale production.

Figure 5:
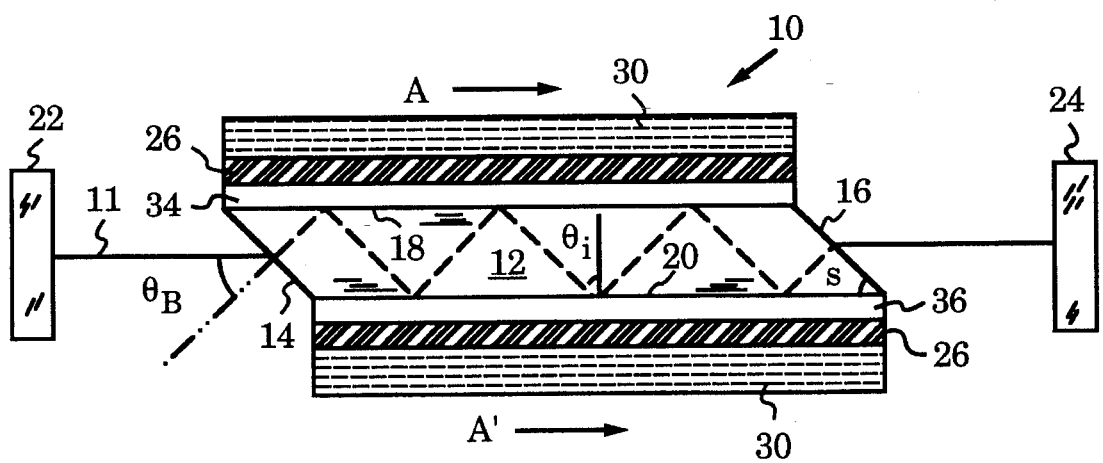
FIG. 5 is a side view of a slab laser with a protective coating according to the invention and an anti-reflective coating.

Since protective coatings applied from solution are superior to prior art coatings, other coats, e.g., anti-reflective layers, can be interposed between the slab and the protective coating. This is illustrated in FIG. 5, where slab 12 has a top anti-reflective layer 34 and a bottom anti-reflective layer 36. Anti-reflective layers 34 and 36 improve the coupling of the pump light into slab 12.

SUMMARY, RAMIFICATIONS, AND SCOPE

The protective coating for slab lasers thus satisfies all of the objectives set. In addition, many variations can be introduced in the method of applying the protective coating and the coating itself without venturing outside the scope of invention.

For example, the protective coating according to the invention can be applied on zig-zag slabs of any geometrical shape. Moreover, one can coat all surfaces of the slab with the exception of input and output faces or Brewster windows. This greatly simplifies the application process in industrial settings. Finally, the protective coating can be applied to the surfaces of other types of lasers in which preserving total internal reflection during pumping presents a problem.

Therefore, the scope of the invention should be determined, not by examples given, but by the appended claims and their legal equivalents.

We claim:

1. An optically pumped solid state laser having:
   a) a lasing medium in the form of a slab, said slab having at least two opposed parallel pumping faces between which a laser beam having a wavelength $\lambda$ propagates along a zig-zag path dictated by total internal reflection between said at least two opposed parallel pumping faces;
   b) an input face for admitting said laser beam; and
   c) an output face for coupling out said laser beam, said slab being coated on said at least two opposed parallel pumping faces with a protective coating selected from the group consisting organic synthetics, processed thermoplastics, and thermosetting polymers, said protective coating being applied onto said slab from a solution whose solvent is chosen from the group comprising ketones, esters, and perfluorinated solvents.

2. The optically pumped solid state laser of claim 1 wherein said protective coating comprises a random copolymer of tetrafluoroethylene (TFE) and 2,2,bis-trifluoromethyl-4,5 difluoro 1,3 dioxole and said solvent comprises a perfluorinated solvent.

3. The optically pumped solid state laser of claim 2 wherein said perfluorinated solvent is a completely fluorinated organic compound comprising primarily $C_8F_{18}$.

4. The optically pumped solid state laser of claim 1 wherein said protective coating is further selected from the group consisting of polymethylmethacrylate (PMMA), polyvinylidene chloride (PVC), polyethylene, polyimide, and Mylar.

5. The optically pumped solid state laser of claim 1 wherein said protective coating has a thickness $t_m$ between 3 μm and 15 μm.

6. The optically pumped solid state laser of claim 5 wherein said thickness $t_m$ is greater than three times said wavelength $\lambda$.

7. The optically pumped solid state laser of claim 1 further comprising a coolant applied along said protective coating.

8. The optically pumped solid state laser of claim 7 wherein said coolant is a liquid.

9. The optically pumped solid state laser of claim 7 wherein said coolant is a solid.

10. The optically pumped solid state laser of claim 1 wherein all faces of said slab with the exception of said input face and said output face are covered with said protective coating.

11. A method for coating an optically pumped solid state laser having a lasing medium in the form of a slab, said slab having at least two opposed parallel pumping faces between which a laser beam having a wavelength $\lambda$ propagates along a zig-zag path dictated by total internal reflection between said opposed parallel pumping faces, an input face for admitting said laser beam, and an output face for coupling out said laser beam, said method comprising:
   a) producing a solution of a protective material selected from the group consisting of organic synthetics, processed thermoplastics, and thermosetting polymers with a solvent chosen from the group comprising ketones, esters, and perfluorinated solvents;
   c) applying said solution on said slab; and
   b) evaporating said solvent to produce a protective coating.

12. The method of claim 11 wherein said solution is applied on said slab by painting.

13. The method of claim 11 wherein said solution is applied on said slab by spinning.

14. The method of claim 11 wherein said solution is applied on said slab by dipping.

15. The method of claim 11 wherein said protective coating has a thickness $t_m$ between 3 μm and 15 μm.

16. The method of claim 15 wherein said protective coating has a thickness $t_m$ greater than three times said wavelength $\lambda$.

17. The method of claim 11 wherein said solution is applied to all faces of said slab with the exception of said input face and said output face.

\* \* \* \* \*